(12) United States Patent
Takahashi

(10) Patent No.: US 8,503,830 B2
(45) Date of Patent: Aug. 6, 2013

(54) DIGITAL IMAGE PROCESSING APPARATUS AND METHOD OF ARRANGING DIGITAL IMAGE FILES USED BY THE SAME

(75) Inventor: Shinri Takahashi, Changwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1218 days.

(21) Appl. No.: 12/322,579

(22) Filed: Feb. 4, 2009

(65) Prior Publication Data

US 2009/0202178 A1 Aug. 13, 2009

(30) Foreign Application Priority Data

Feb. 12, 2008 (KR) .................. 10-2008-0012603

(51) Int. Cl.
*G06T 1/00* (2006.01)
*G06F 12/00* (2006.01)

(52) U.S. Cl.
USPC .................. 382/305; 348/231.2; 707/829

(58) Field of Classification Search
USPC ........ 382/305; 358/403; 348/231.2; 707/821, 707/828, 829
See application file for complete search history.

(56) References Cited

U.S. PATENT DOCUMENTS

2006/0004822 A1 * 1/2006 Kim et al. .................. 707/101
2009/0013005 A1 * 1/2009 Hung ........................... 707/200

FOREIGN PATENT DOCUMENTS

| JP | 2003-114820 A | 4/2003 |
| JP | 2007-128139 A | 5/2007 |
| WO | WO 2006090606 A1 * | 8/2006 |

* cited by examiner

*Primary Examiner* — Jon Chang
(74) *Attorney, Agent, or Firm* — Drinker Biddle & Reath LLP

(57) ABSTRACT

A digital image processing apparatus capable of effective file management during the duplication and movement of a digital image file between digital image processing apparatuses, and a file arranging method used by the digital image processing apparatus. The apparatus stores a digital image file with a name including a serial number under a folder with a name including a part indicating a manufacturing company and a serial number. When the apparatus duplicates or moves a first digital image file stored in a first digital image processing apparatus to a second digital image processing apparatus, the digital image processing apparatus compares a name of a folder containing the first digital image file with a name of a folder of the second digital image processing apparatus, duplicates or moves the first digital image file to the folder, or generates a new folder and duplicates or moves the first digital image file to the new folder.

26 Claims, 9 Drawing Sheets

DIGITAL IMAGE PROCESSING APPARATUS AND METHOD OF ARRANGING DIGITAL IMAGE FILES USED BY THE SAME

CROSS-REFERENCE TO RELATED PATENT APPLICATION

This application claims the benefit of Korean Patent Application No. 10-2008-0012603, filed on Feb. 12, 2008, in the Korean Intellectual Property Office, the entire content of which is incorporated herein by reference.

BACKGROUND OF THE INVENTION

1. Field of the Invention

The present invention relates to a digital image processing apparatus and a file arranging method used by the digital image processing apparatus. More particularly, the present invention relates to a digital image processing apparatus capable of an effective file management during the duplication and movement of a digital image file between digital image processing apparatuses, and a file arranging method used by the digital image processing apparatus.

2. Description of the Related Art

A digital image processing apparatus generally displays or modifies a digital image stored in a storage medium included in the digital image processing apparatus. Furthermore, a digital capturing device, which is an example of the digital image processing apparatus, stores data of an image obtained by performing a capturing operation in a capturing mode in a storage medium, and displays an image on a display unit by using the data stored in the storage medium.

Conventional digital image processing apparatuses duplicate or move digital image files stored in storage media of digital image processing apparatuses connected to computers, or duplicate or move digital image files stored in computers to storage media of digital image processing apparatuses. Conventional digital image processing apparatuses are typically connected to each other via cable or wireless communication and exchange digital image files stored in storage media of the digital image processing apparatuses.

Conventional digital image processing apparatuses, which are connected to computers and transmit digital image files to each other, simply duplicate or move digital image files irrespective of folders containing the digital image files. In this case, when one of digital image processing apparatuses and computers simply duplicate or move digital image files to other digital image processing apparatuses and computers, if folders to which digital image files are moved contain digital image files with the same name as digital image files that are to be duplicated or moved, digital image files contained in folders to which digital image files are moved are automatically deleted, or digital image files that are to be moved are automatically renamed and are duplicated or moved. The former results in an undesired deletion of digital image files that are previously contained in folders. The latter results in a name change of some of a plurality of digital image files that are to be duplicated or moved and a loss of continuity of a file name, thus making it inconvenient to manage files.

SUMMARY OF THE INVENTION

The present invention provides a digital image processing apparatus capable of an effective file management during the duplication and movement of a digital image file between digital image processing apparatuses, and a file arranging method used by the digital image processing apparatus.

Accordingly, an embodiment of the present invention provides a digital image processing apparatus that stores a digital image file with a name including a serial number under a folder with a name including a part indicating a manufacturing company and a serial number, wherein a first digital image file stored in a first digital image processing apparatus is duplicated or moved to a second digital image processing apparatus. The digital image processing apparatus compares a name of a folder containing the first digital image file of the first digital image processing apparatus with a name of a folder of the second digital image processing apparatus, duplicates or moves the first digital image file to the folder of the second digital image processing apparatus, or generates a new folder in the second digital image processing apparatus, and duplicates or moves the first digital image file to the new folder of the second digital image processing apparatus.

If a part indicating a manufacturing company included in the name of the folder containing the first digital image file is not included in the name of the folder of the second digital image processing apparatus before the duplication or movement of the first digital image file, the digital image processing apparatus may generate a new folder in the second digital image processing apparatus and duplicate or moves the first digital image file to the new folder. A name of the new folder generated in the second digital image processing apparatus may include the part indicating the manufacturing company included in the folder containing the first digital image file. The name of the new folder generated in the second digital image processing apparatus may include a serial number greater than a serial number included in the name of the folder of the second digital image processing apparatus.

When the digital image processing apparatus duplicates or moves the first digital image file to the new folder generated in the second digital image processing apparatus, the name of the first digital image file under a new folder generated in the second digital image processing apparatus may include an initial serial number. If the part indicating the manufacturing company included in the name of the folder containing the first digital image file is included in the name of the folder of the second digital image processing apparatus before the duplication or movement of the first digital image file, the digital image processing apparatus may duplicate or move the first digital image file to the folder of the second digital image processing apparatus.

When the digital image processing apparatus duplicates or moves the first digital image file to the folder of the second digital image processing apparatus, the name of the first digital image file under the folder of the second digital image processing apparatus may include a serial number subsequent to a last serial number included in a digital image file contained in the folder of the second digital image processing apparatus. If the part indicating the manufacturing company included in the name of the folder containing the first digital image file is included in the name of the folder of the second digital image processing apparatus before the duplication or movement of the first digital image file, the digital image processing apparatus may compare a model name of a digital image processing apparatus stored in a header of the digital image file under the folder of the second digital image processing apparatus with that of the first digital image. If both model names are identical to each other, the digital image processing apparatus may duplicate or move the first digital image file to the folder of the second digital image processing apparatus, and if both model names are not identical to each other, the digital image processing apparatus may generate a new folder in the second digital image processing apparatus, and duplicate or move the first digital image file to the new folder.

A name of the folder generated in the second digital image processing apparatus may include a part indicating a manufacturing company included in the folder containing the first digital image file, and a serial number greater than a serial number included in the name of the folder of the second digital image processing apparatus before the duplication or movement of the first digital image file. When the digital image processing apparatus duplicates or moves the first digital image file to the new folder generated in the second digital image processing apparatus, the name of the first digital image file under a new folder generated in the second digital image processing apparatus may include an initial serial number. When the digital image processing apparatus duplicates or moves the first digital image file to the folder of the second digital image processing apparatus, the name of the first digital image file under the folder of the second digital image processing apparatus may include a serial number subsequent to a last serial number included in a digital image file contained in the folder of the second digital image processing apparatus.

Another embodiment of the present invention provides a digital image file arranging method used by a digital image processing apparatus that stores a digital image file with a name including a serial number under a folder with a name including a part indicating a manufacturing company and a serial number. The method, comprises the following operations: when a first digital image file stored in a first digital image processing apparatus is duplicated or moved to a second digital image processing apparatus, comparing a name of a folder containing the first digital image file of the first digital image processing apparatus with a name of a folder of the second digital image processing apparatus, duplicating or moving the first digital image file to the folder of the second digital image processing apparatus, or generating a new folder in the second digital image processing apparatus, and duplicating or moving the first digital image file to the new folder of the second digital image processing apparatus.

If a part indicating a manufacturing company included in the name of the folder containing the first digital image file is not included in the name of the folder of the second digital image processing apparatus before the duplication or movement of the first digital image file, a new folder may be generated in the second digital image processing apparatus and the first digital image file is duplicated or moved to the new folder. A name of the new folder generated in the second digital image processing apparatus may include the part indicating the manufacturing company included in the folder containing the first digital image file. Also, the name of the new folder generated in the second digital image processing apparatus may include a serial number greater than a serial number included in the name of the folder of the second digital image processing apparatus. The first digital image file may be duplicated or moved to the new folder generated in the second digital image processing apparatus, and the name of the first digital image file under the new folder generated in the second digital image processing apparatus may include an initial serial number.

If the part indicating the manufacturing company included in the name of the folder containing the first digital image file is included in the name of the folder of the second digital image processing apparatus before the duplication or movement of the first digital image file, the first digital image file may be duplicated or moved to the folder of the second digital image processing apparatus. When the first digital image file is duplicated or moved to the folder of the second digital image processing apparatus, the name of the first digital image file under the folder of the second digital image processing apparatus may include a serial number subsequent to a last serial number included in a digital image file contained in the folder of the second digital image processing apparatus.

If the part indicating the manufacturing company included in the name of the folder containing the first digital image file is included in the name of the folder of the second digital image processing apparatus before the duplication or movement of the first digital image file, a model name of a digital image processing apparatus stored in a header of the digital image file under the folder of the second digital image processing apparatus may be compared with that of the first digital image. If both model names are identical to each other, the first digital image file is duplicated or moved to the folder of the second digital image processing apparatus, and if both model names are not identical to each other, a new folder may be generated in the second digital image processing apparatus, and the first digital image file is duplicated or moved to the new folder.

A name of the folder generated in the second digital image processing apparatus may include a part indicating a manufacturing company included in the folder containing the first digital image file, and a serial number greater than a serial number included in the name of the folder of the second digital image processing apparatus before the duplication or movement of the first digital image file. The first digital image file may be duplicated or moved to the new folder generated in the second digital image processing apparatus, the name of the first digital image file under the new folder generated in the second digital image processing apparatus includes an initial serial number. When the first digital image file is duplicated or moved to the folder of the second digital image processing apparatus, the name of the first digital image file under the folder of the second digital image processing apparatus may include a serial number subsequent to a last serial number included in a digital image file contained in the folder of the second digital image processing apparatus.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE EMBODIMENTS

Embodiments of the present invention will now be described with reference to the attached drawings.

Figure 1:
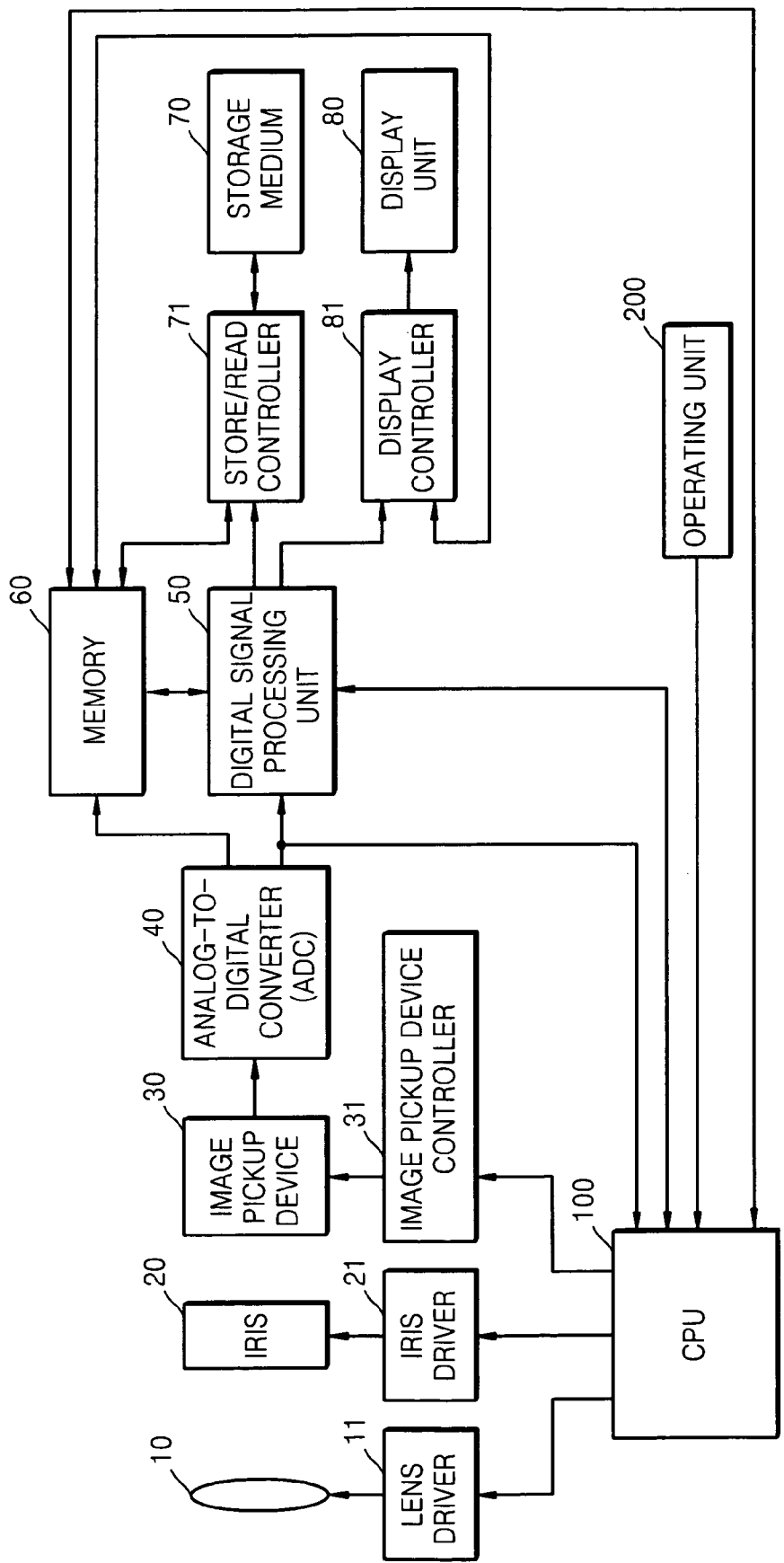
FIG. 1 is a block diagram of an example of a digital image processing apparatus according to an embodiment of the present invention.

FIG. 1 is a block diagram of an example of a digital capturing apparatus that is a digital image processing apparatus according to an embodiment of the present invention. Referring to FIG. 1, a general operation of the digital capturing apparatus in this example is controlled by a Central Processing Unit (CPU) 100. The digital capturing apparatus also includes an operating unit 200 including a key for generating an electrical signal by an operation of a user. The electrical signal generated by the operating unit 200 is transmitted to the CPU 100, allowing the CPU 100 to control the digital capturing apparatus according to the electrical signal.

In a capturing mode, when the electrical signal is transmitted to the CPU 100, the CPU 100 detects the electrical signal and controls a lens driver 11, an iris driver 21, and an image pickup device controller 31, thereby controlling a position of a lens 10, an opening grade of an iris 20, and the sensitivity of an image pickup device 30. The image pickup device 30 generates data of an image from an input light. An analog-to-digital converter (ADC) 40 converts analog data that is output from the image pickup device 30 into digital data. The digital capturing apparatus may not comprise the ADC 40 according to the characteristics of the image pickup device 30.

The data that is output from the image pickup device 30 may be input into a digital signal processing unit 50 directly or via a memory 60, or may be input into the CPU 100. The memory 60 includes Read Only Memory (ROM) and Random Access Memory (RAM). The digital signal processing unit 50 performs digital processing, such as gamma compensation, white balance adjustment, etc.

The image data output from the digital signal processing unit 50 is transmitted to a display controller 81 directly or via a memory 60. The display controller 81 controls a display unit 80 to display an image on the display unit 80. The image data output from the digital signal processing unit 50 can be input to a store/read controller 71 directly or via the memory 60, wherein the store/read controller 71 stores the image data in a storage medium 70 automatically or according to a signal from the user. The store/read controller 71 may display an image on the display unit 80 by reading image data from an image file stored in the storage medium 70 and transmitting the image data to the display controller 81 via the memory 60. The storage medium 70 may be detached/attached from/to the digital capturing apparatus or may be eventually embedded therein. The digital capturing apparatus generates image data from light that is incident to the image pickup device 30 through the lens 10, and finally stores a digital image file having the image data in the storage medium 70.

The digital capturing apparatus illustrated in FIG. 1 is an embodiment of the digital image processing apparatus, but the digital image processing apparatus according to the present invention is not limited to such a digital capturing apparatus. For example, Personal Digital Assistants (PDAs) or Portable Multimedia Players (PMPs) may be examples of the digital image processing apparatus. That is, the digital image processing apparatus comprises the storage medium 70 that can be detached/attached therefrom/thereto or can be eventually embedded therein and can store a digital image file.

The digital image processing apparatus stores a digital image file according to a certain rule when storing the digital image file into the storage medium 70. The digital image processing apparatus basically stores the digital image file under a folder with a name including a manufacturing company and a serial number. For example, the digital image processing apparatus may generate a folder named "100SSCAM" indicating a serial number "100" and a manufacturing company "SSCAM" in the storage medium 70 and store the digital image file under the folder "100SSCAM". A part of the name indicating the manufacturing company may be a name of the manufacturing company, an abbreviation thereof, or an optional combination of characters or numbers. The digital image file may be named "SSL0001.JPG" including a manufacturing company "SSL" and a serial number "001". An extension "JPG" indicates a file type and may be another extension such as TIF or the like.

The digital image processing apparatus compares a name of a folder containing a first digital image file stored in a first digital image apparatus with a folder of a second digital image processing apparatus and duplicates or moves the first digital image file to the folder of the second digital image processing apparatus, or generates a new folder in the second digital image processing apparatus and duplicates or moves the new folder to the first digital image file. The above process will now be described with reference to FIGS. 2A and 2B that are conceptual diagrams for arranging digital image files of a digital image processing apparatus according to an embodiment.

A first digital image processing apparatus 1701 stores a digital image file 1111 named "DSC0001.JPG" and a digital image file 1112 named "DSC0002.JPG" under a folder 1110 named "100MSDCF". The folder 1110 named "100MSDCF" may be under a folder 1100 named "DCIM" indicating that digital image files are stored under the folder 1100 named "DCIM".

Figure 2A:
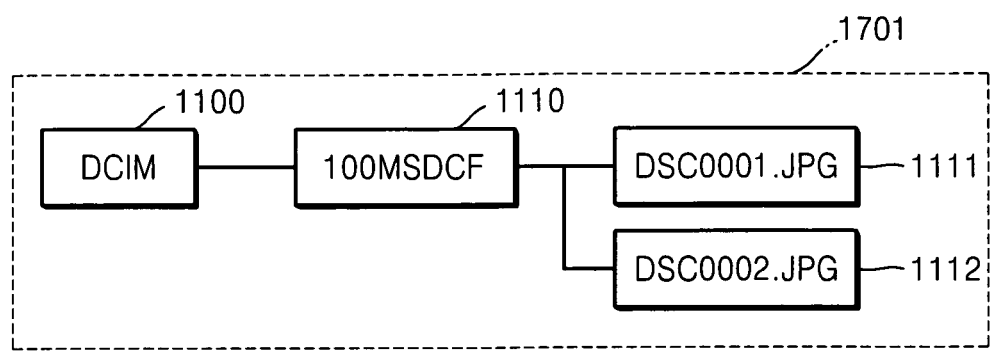
FIGS. 2A and 2B are examples of conceptual diagrams for arranging digital image files of a digital image processing apparatus according to an embodiment of the present invention.
Figure 2A:
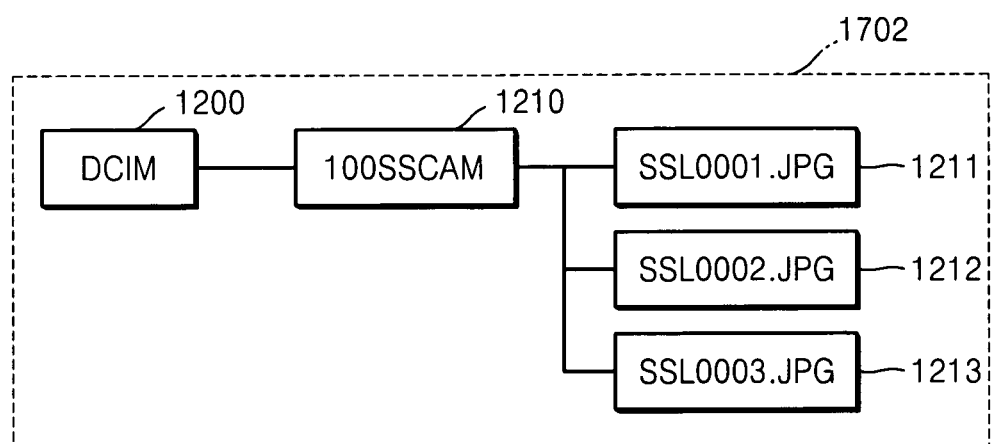
Figure 2B:
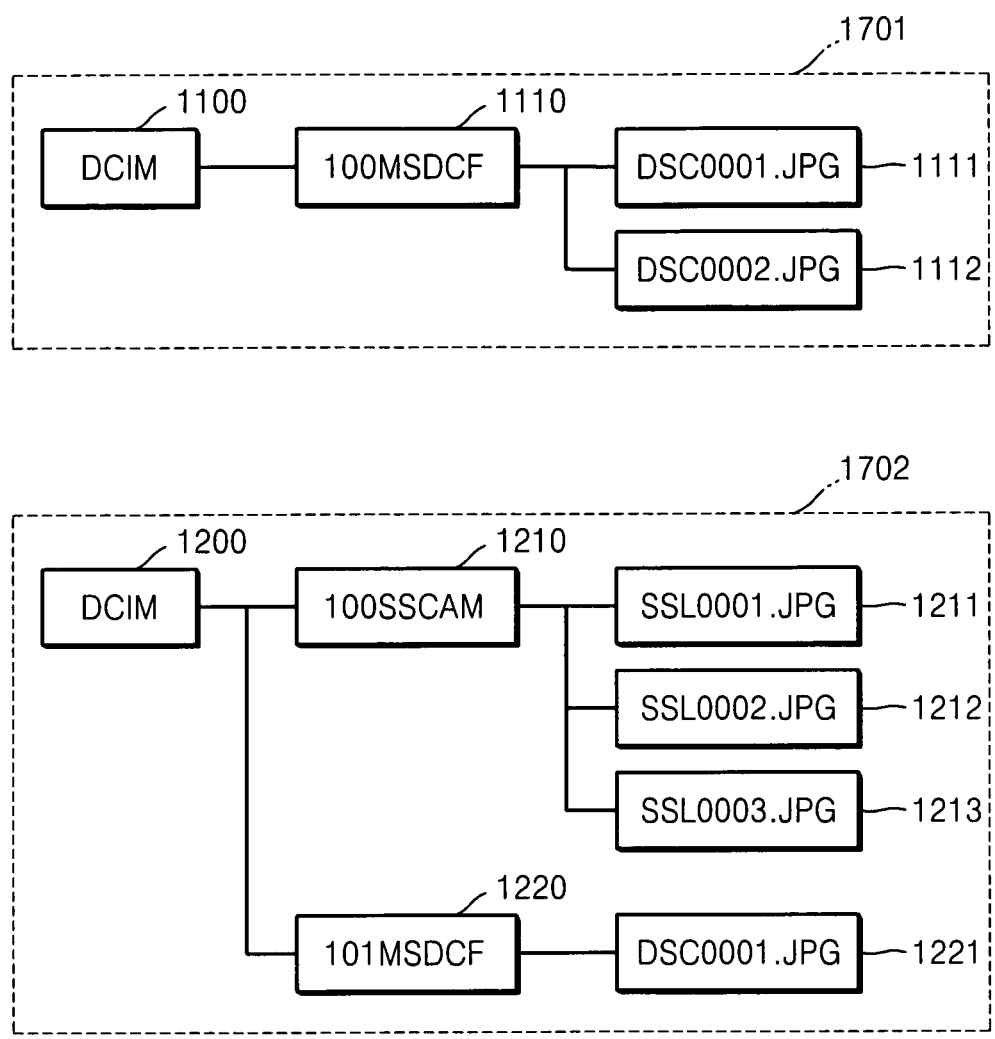

Referring to FIG. 2B, a second digital image processing apparatus 1702 stores a digital image file 1211 named "SSL0001.JPG", a digital image file 1212 named "SSL0002.JPG", and a digital image file 1213 named "SSL0003.JPG" under a folder 1210 named "100SSCAM". The folder 1210 named "100SSCAM" may be under a folder 1200 named "DCIM" indicating that digital image files are stored under the folder 1200 named "DCIM".

Under these circumstances, a duplication or movement of the digital image file 1112 named "DSC0002.JPG" stored in the first digital image processing apparatus 1701 to the second digital image processing apparatus 1702 will now be described. Hereinafter the digital image file 1112 named "DSC0002.JPG" stored in the first digital image processing apparatus 1701 refers to a first digital image file 1112 for convenience of description.

When the first digital image file 1112 is duplicated or moved to the second digital image processing apparatus 1702, the name of the folder 1110 containing the first digital image file 1112 is compared with the name of the folder 1210 of the second digital image file 1702. According to the comparison result, the first digital image file 1112 is duplicated or moved to the folder 1210 of the second digital image processing apparatus 1702, or a new folder is generated in the second digital image processing apparatus 1702 and the first digital image file 1112 is duplicated or moved to the new folder.

If a part indicating a manufacturing company included in the name of the folder 1110 containing the first digital image file 1112 is not included in the name of the folder 1210 of the second digital image processing apparatus 1702 before the duplication or movement of the first digital image file 1112, a new folder is generated in the second digital image processing apparatus 1702 and the first digital image file 1112 is duplicated or moved to the new folder. Referring to FIG. 2A, although "MSDCF" indicates a manufacturing company included in the name of the folder 1110 containing the first digital image file 1112 that is to be duplicated or moved, the MSDCF" is not included in the name "100SSCAM" of the folder 1210 of the second digital image processing apparatus 1702. Therefore, referring to FIG. 2B, a new folder 1220 is generated in the second digital image processing apparatus 1702 and the first digital image file 1112 is duplicated or moved to the new folder 1220.

In this case, a name of the folder 1220 generated in the second digital image processing apparatus 1702 may include the part indicating the manufacturing company included in the folder 1110 containing the first digital image file 1112. Also, the name of the folder 1220 generated in the second digital image processing apparatus 1702 may include a serial number greater than a serial number included in the name of the folder 1210 of the second digital image processing apparatus 1702. Now that the "MSDCF" indicates the manufacturing company included in the name of the folder 1110 containing the first digital image file 1112 before duplicated or moved and "100" is the serial number included in the name of the folder 1210 of the second digital image processing apparatus 1702, the name of the folder 1220 generated in the second digital image processing apparatus 1702 may be "101MSDCF" with reference to FIG. 2B. When the first digital image file 1112 is duplicated or moved to the folder 1220 generated in the second digital image processing apparatus 1702, the name of the first digital image file 1112 under the folder 1220 generated in the second digital image processing apparatus 1702 may include an initial serial number. The first digital image file 1112 under the folder 1220 generated in the second digital image processing apparatus 1702 maintains a name format as in the first digital image processing apparatus 1701 before the first digital image file 1112 is duplicated or moved but the first digital image file 1112 is renamed "DSC0001.JPG" wherein a serial number is changed to an initial serial number "0001".

Meanwhile, unlike FIG. 2A, if the part indicating the manufacturing company and included in the name of the folder 1110 containing the first digital image file 1112 is included in the name of a specific folder of the second digital image processing apparatus 1702 before the duplication or movement of the first digital image file 1112, a new folder is not generated in the second digital image processing apparatus 1702 but the first digital image file 1112 may be duplicated or moved to the specific folder of the second digital image processing apparatus 1702. In this case, the first digital image file 1112 may be renamed to include, for example, a serial number subsequent to a last serial number included in the specific folder so that the renamed first digital image file 1112 may be duplicated or moved to the specific folder of the second digital image processing apparatus 1702. For example, if a digital image file named "DSC0012.JPG" is contained in the specific folder of the second digital image processing apparatus 1702, the first digital image file 1112 of the first digital image processing apparatus 1701 may be renamed to "DSC0013.JPG" and stored or moved to the specific folder of the second digital image processing apparatus 1702.

The digital image processing apparatuses according to the present invention are connected to each other via a cable or wireless communication and duplicate or move digital image files stored in storage media of each digital image processing apparatus, making it possible to systematically arranging and managing digital image files. If digital image processing apparatuses that are connected to each other are manufactured by different manufacturing companies, a new folder is generated and a digital image file is moved or duplicated to the new folder, and if digital image processing apparatuses that are connected to each other are manufactured by the same manufacturing company, a digital image file is moved or duplicated to a given folder, so that digital image files generated by digital image processing apparatuses that are manufactured by different manufacturing companies are arranged in folders, providing a user convenience of management of digital image files.

Figure 3A:
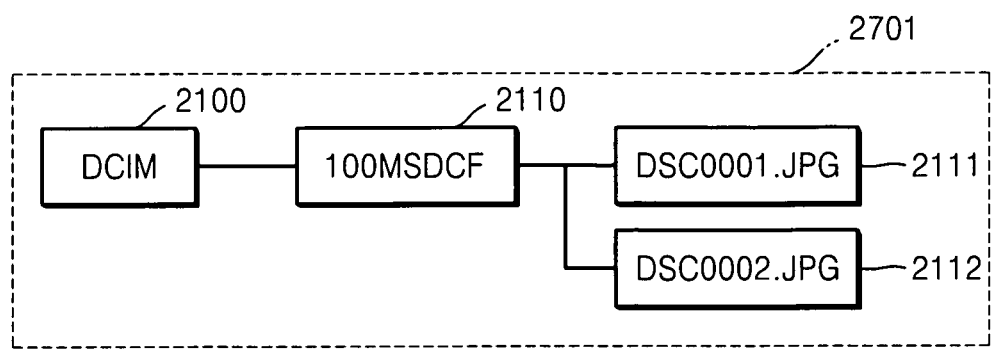
FIGS. 3A and 3B are examples of conceptual diagrams for arranging digital image files of a digital image processing apparatus according to another embodiment of the present invention.
Figure 3A:
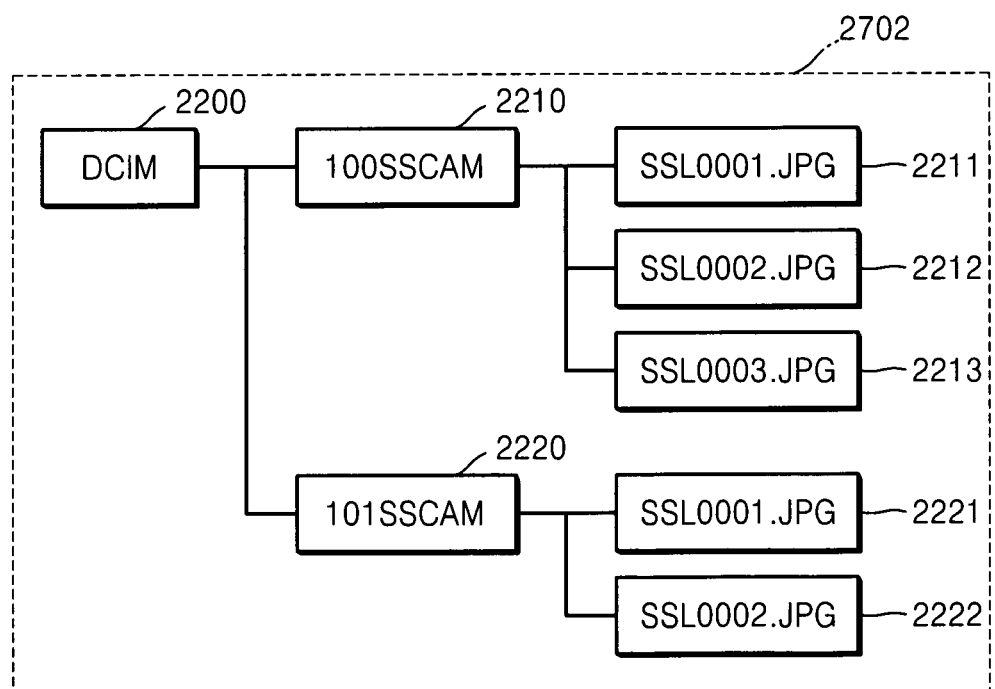
Figure 3B:
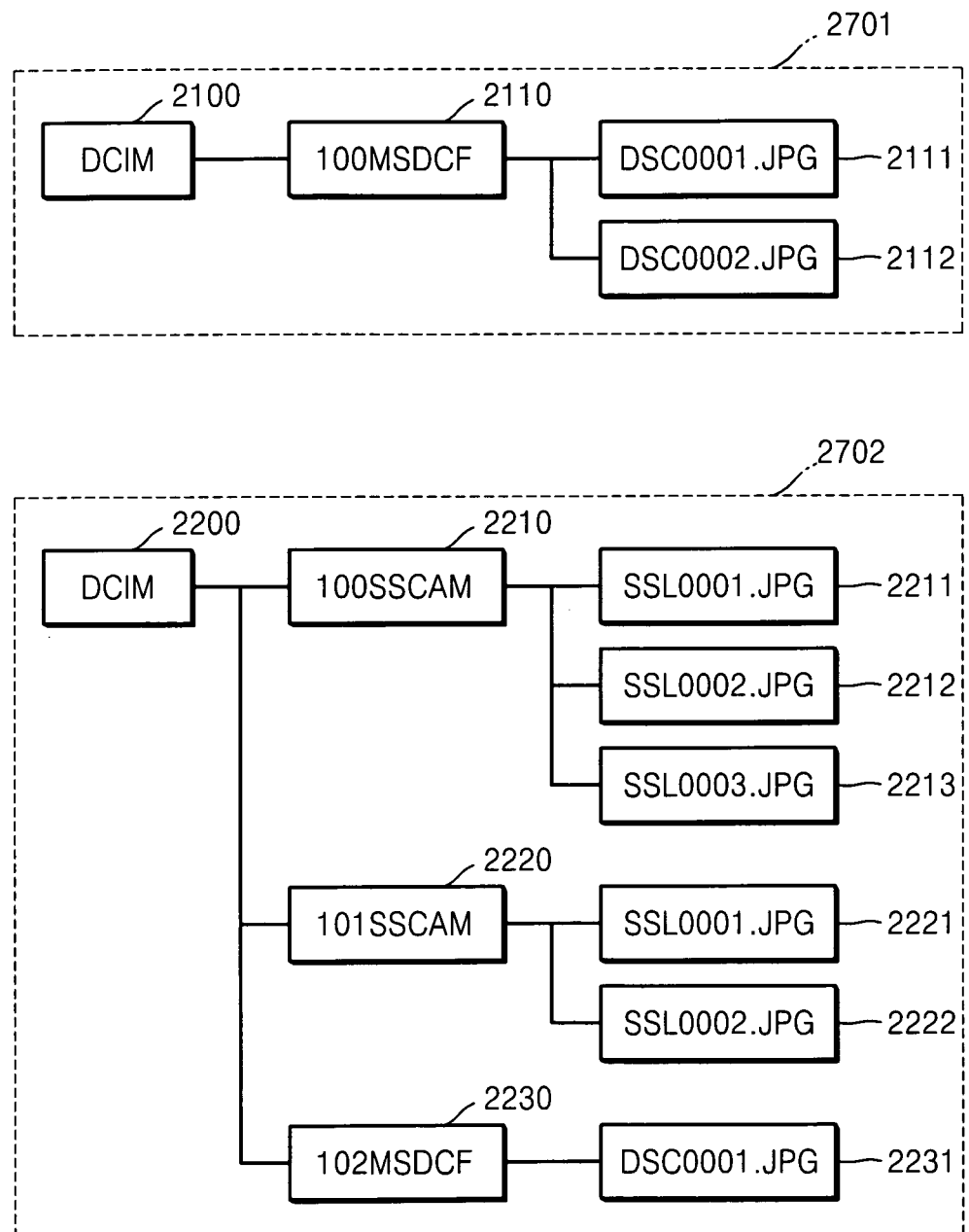

FIGS. 3A and 3B are conceptual diagrams for arranging digital image files of a digital image processing apparatus according to another embodiment. Referring to FIG. 3A, a first digital image processing apparatus 2701 stores a digital image file 2111 named "DSC0001.JPG" and a digital image file 2112 named "DSC0002.JPG" under a folder 2110 named "100MSDCF". The folder 2110 named "100MSDCF" may be under a folder 2100 named "DCIM" indicating that digital image files are stored under the folder 2100.

A second digital image processing apparatus 2702 stores a digital image file 2211 named "SSL0001.JPG", a digital image file 2212 named "SSL0002.JPG", and a digital image file 2213 named "DSC0003.JPG" under a folder 2210 named "100SSCAM", and stores a digital image file 2211 named "SSL0001.JPG" and a digital image file 2212 named "SSL0002.JPG" under a folder 2220 named "101SSCAM". The folder 2210 named "100SSCAM" and the folder 2220 named "101SSCAM" may be under a folder 2200 named "DCIM" indicating that digital image files are stored under the folder 2200.

Under these circumstances, a duplication or movement of the digital image file 2112 named "DSC0002.JPG" stored in the first digital image processing apparatus 2701 to the second digital image processing apparatus 2702 will now be described. Hereinafter the digital image file 2112 named "DSC0002.JPG" stored in the first digital image processing apparatus 2701 refers to a first digital image file 2112 for convenience of description.

When the first digital image file 2112 is duplicated or moved to the second digital image processing apparatus 2702, the name of the folder 2110 containing the first digital image file 2112 is compared with the names of the folders 2210 and 2220 of the second digital image file 2702. According to the comparison result, the first digital image file 2112 is duplicated or moved to the folders 2210 and 2220 of the second digital image processing apparatus 2702, or a new folder is generated in the second digital image processing apparatus 2702 and the first digital image file 2112 is duplicated or moved to the new folder.

If a part indicating a manufacturing company and included in the name of the folder 2110 containing the first digital image file 2112 is not included in the names of the folders 2210 and 2220 of the second digital image processing apparatus 2702 before the duplication or movement of the first digital image file 2112, a new folder is generated in the second digital image processing apparatus 2702 and the first digital image file 2112 is duplicated or moved to the new folder. Referring to FIG. 3A, although "MSDCF" indicates a manufacturing company included in the name of the folder 2110 containing the first digital image file 2112 that is to be duplicated or moved, the MSDCF" is not included in the names "100SSCAM" and "101SSCAM" of the folders 2210 and 2220 of the second digital image processing apparatus 2702. Therefore, referring to FIG. 3B, a new folder 2230 is generated in the second digital image processing apparatus 2702 and the first digital image file 2112 is duplicated or moved to the new folder 2230.

In this case, a name of the folder 2230 generated in the second digital image processing apparatus 2702 may include the part indicating the manufacturing company included in the folder 2110 containing the first digital image file 2112. Also, the name of the folder 2230 generated in the second digital image processing apparatus 2702 may include a serial number greater than a serial number included in the names of the folders 2210 and 2220 of the second digital image processing apparatus 2702. Now that the "MSDCF" indicates the manufacturing company included in the name of the folder 2110 containing the first digital image file 2112 before duplicated or moved and "100" and "101" are serial numbers included in the names of the folders 2210 and 2220 of the second digital image processing apparatus 2702, the name of the folder 2230 generated in the second digital image processing apparatus 2702 may be "102MSDCF" with reference to FIG. 3B.

When the first digital image file 2112 is duplicated or moved to the folder 2230 generated in the second digital image processing apparatus 2702, the name of the first digital image file 2112 under the folder 2230 generated in the second digital image processing apparatus 2702 may include an initial serial number. The first digital image file 2112 under the folder 2230 generated in the second digital image processing apparatus 2702 maintains a name format as in the first digital image processing apparatus 2701 before the first digital image file 2112 is duplicated or moved but the first digital image file 2112 is renamed "DSC0001.JPG" wherein a serial number is changed to an initial serial number "0001".

Unlike FIG. 3A, if the part indicating the manufacturing company and included in the name of the folder 2110 containing the first digital image file 2112 is included in the name of specific folders of the second digital image processing apparatus 2702 before the duplication or movement of the first digital image file 2112, a new folder is not generated in the second digital image processing apparatus 2702 but the first digital image file 2112 may be duplicated or moved to specific folders of the second digital image processing apparatus 2702. In this case, if a plurality of folders with names including parts indicating the manufacturing company included in the name of the folder 2110 containing the first digital image file 2112 before the duplication or movement of the first digital image file 2112 are included in the second digital image processing apparatus 2702, the first digital image file 2112 may be duplicated or moved to a folder with a name including the greatest serial number among the plurality of folders. The first digital image file 2112 may be renamed to include, for example, a serial number subsequent to a last serial number included therein so that the renamed first digital image file 2112 may be duplicated or moved to the specific folders of the second digital image processing apparatus 2702. If a digital image file named "DSC0012.JPG" is contained in the specific folders of the second digital image processing apparatus 2702, the first digital image file 2112 of the first digital image processing apparatus 2701 may be renamed to "DSC0013.JPG" and stored or moved to the specific folders of the second digital image processing apparatus 2702.

If two digital image processing apparatuses are manufactured by the same manufacturing company, a part indicating a manufacturing company included in a name of a folder of one of two digital image processing apparatuses may be the same as that of another of two digital image processing apparatuses. In this regard, a digital image file can be duplicated or moved according to a model name of two digital image processing apparatuses. This will be described below.

Figure 4:
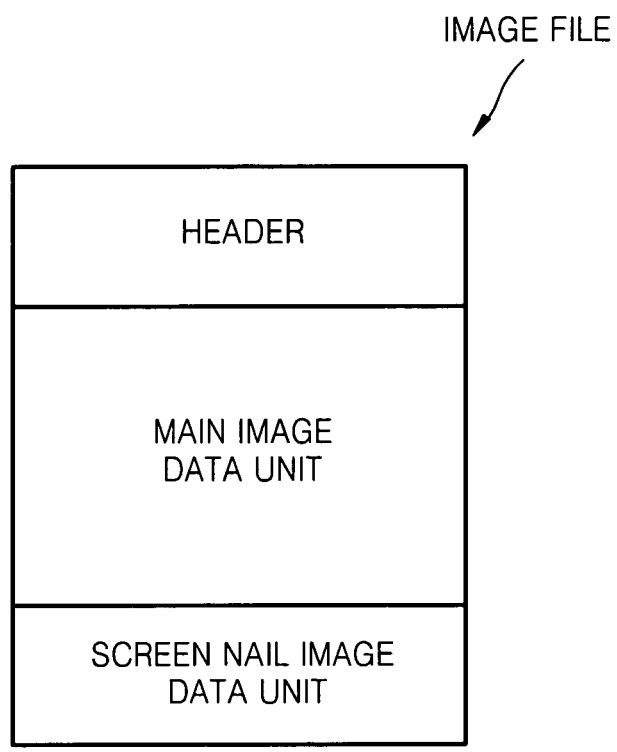
FIG. 4 illustrates an example of a configuration of an image file stored in a digital image processing apparatus according to an embodiment of the present invention.

FIG. 4 illustrates an example of a configuration of an image file stored in a digital image processing apparatus according to an embodiment of the present invention. Referring to FIG. 4, the image file includes a header, a main image data part and a screen nail image data part. The configuration of the image file of the present embodiment is not limited to the configuration illustrated in FIG. 4 and various modifications thereof can be made.

The main image data part stores data regarding a still image. The header stores data regarding a digital image processing apparatus manufacturer, a model name of the digital image processing apparatus, a photographing date and time, a shutter speed, an iris value, or a zoom magnification of a digital photographing apparatus that is the digital image processing apparatus. The header may store thumbnail image data. A thumbnail image corresponds to a reduced image of a main image stored in the main image data part.

The screen nail image data part stores image data that is used when an image file is reproduced and an image corresponding to the reproduced image file is displayed on a display unit. The display unit included in the digital image processing apparatus has a small size, and thus, there is no need to display a screen nail image on the display unit using image data (that is, original image data) stored in the main image data part. In particular, since the size of data stored in the main image data part is generally much larger than the size of data required to display the screen nail image on the display unit, a time required for data processing is increased and the quality of the screen nail image displayed on the display unit is deteriorated if the screen nail image is displayed on the display unit using the data stored in the main image data part. Accordingly, small-size data required to display the screen nail image displayed on the display unit of the digital image processing apparatus is additionally provided in an image file. This data corresponds to the data stored in the screen nail image data part. Image data in this example having a resolution of 640×480 is generally stored in the screen nail image data part.

A digital image file stores information regarding a digital image processing apparatus manufacturer, a model name of a digital image processing apparatus, and the like that are used to generate or modify the digital image file in a header, so that digital image processing apparatuses can use data stored in the header of the digital image file to duplicate or move the digital image file. This will be described with reference to FIGS. 5A and 5B.

Figure 5A:
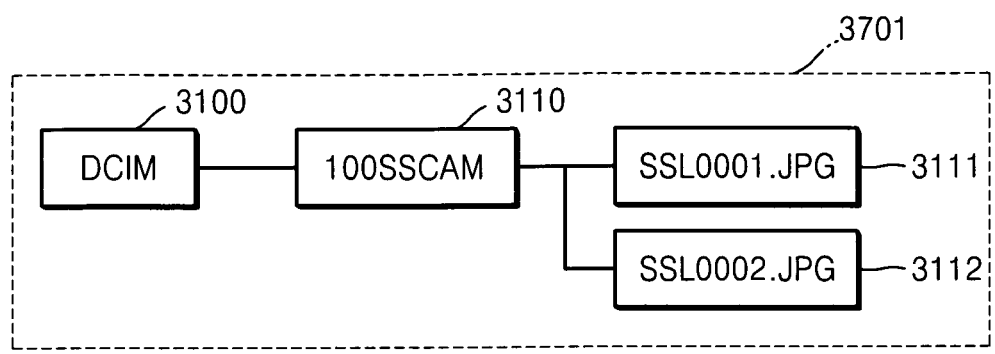
FIGS. 5A and 5B are examples of conceptual diagrams for arranging digital image files of a digital image processing apparatus according to another embodiment of the present invention.
Figure 5A:
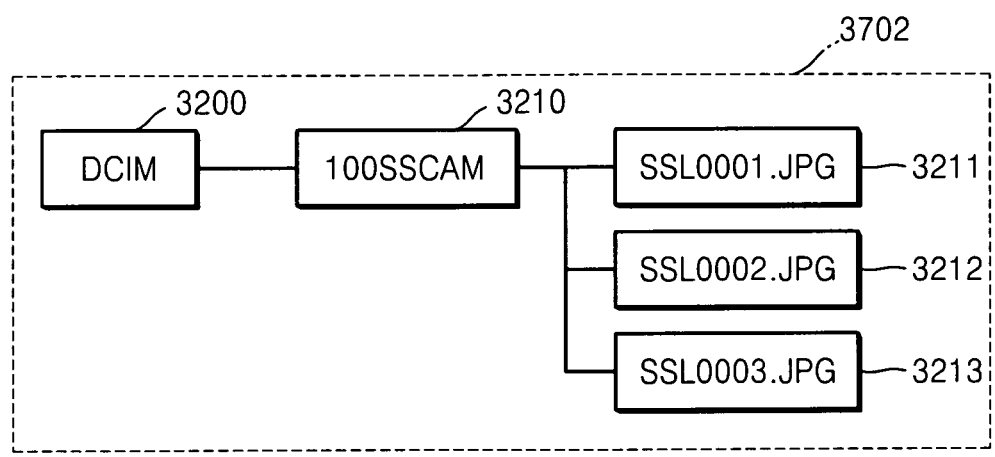
Figure 5B:
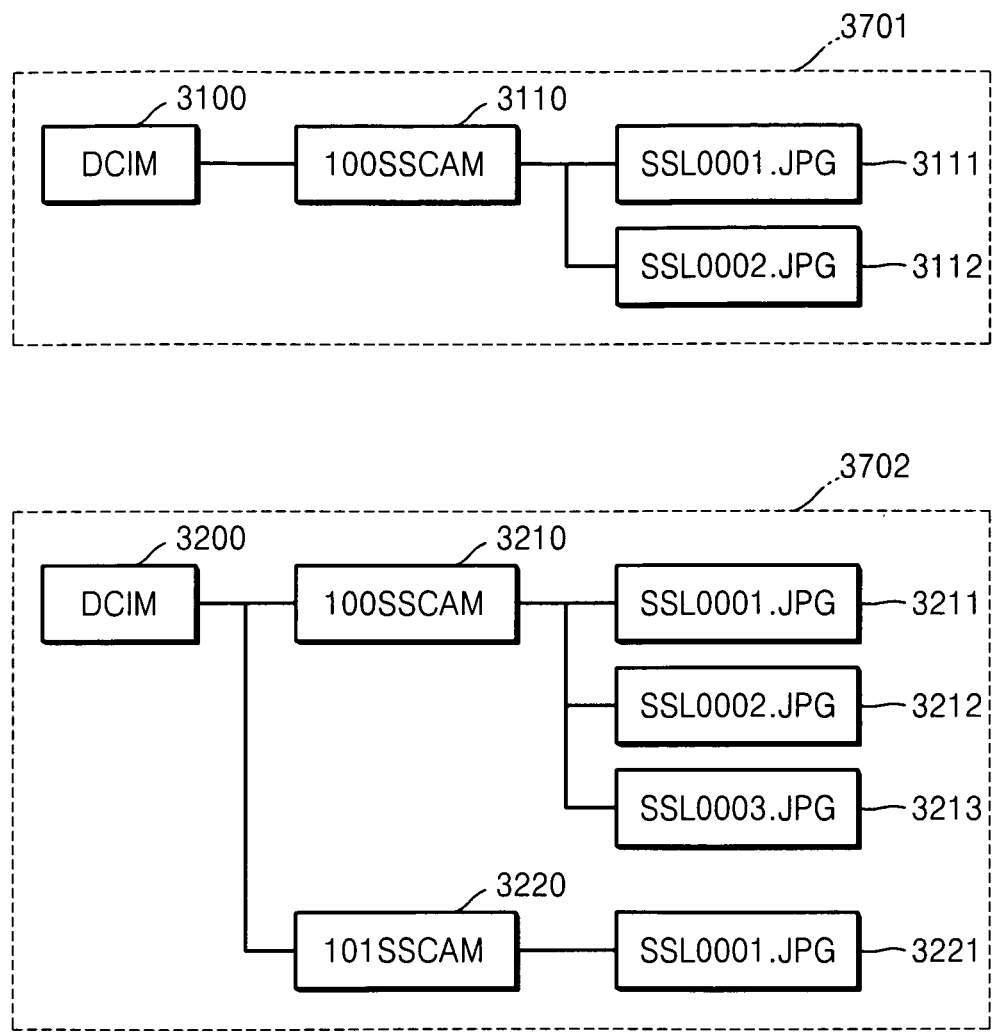

FIGS. 5A and 5B are examples of conceptual diagrams for arranging digital image files of a digital image processing apparatus according to another embodiment of the present invention. Referring to FIG. 5A, a first digital image processing apparatus 3701 stores a digital image file 3111 named "SSL0001.JPG" and a digital image file 3112 named "SSL0002.JPG" under a folder 3110 named "100SSCAM". The folder 3110 named "100SSCAM" may be under a folder 3100 named "DCIM" indicating that digital image files are stored under the folder 3100 named "DCIM".

A second digital image processing apparatus 3702 stores a digital image file 3211 named "SSL0001.JPG", a digital image file 3212 named "SSL0002.JPG", and a digital image file 3213 named "SSL0003.JPG" under a folder 3210 named "100SSCAM". The folder 3210 named "100SSCAM" may be under a folder 3200 named "DCIM" indicating that digital image files are stored under the folder 3200 named "DCIM".

Under these circumstances, a duplication or movement of the digital image file 3112 named "SSL0002.JPG" stored in the first digital image processing apparatus 3701 to the second digital image processing apparatus 3702 will now be described. Hereinafter the digital image file 3112 named "SSL0002.JPG" stored in the first digital image processing apparatus 3701 refers to a first digital image file 3112 for convenience of description.

When the first digital image file 3112 is duplicated or moved to the second digital image processing apparatus 3702, the name of the folder 3110 containing the first digital image file 3112 is compared with the name of the folder 3210 of the second digital image file 3702. According to the comparison result, the first digital image file 3112 is duplicated or moved to the folder 3210 of the second digital image processing apparatus 3702, or a new folder is generated in the second digital image processing apparatus 3702 and the first digital image file 3112 is duplicated or moved to the new folder.

Unlike FIG. 5A, if a part indicating a manufacturing company and included in the name of the folder 3110 containing the first digital image file 3112 is not included in the name of the folder 3210 of the second digital image processing apparatus 3702 before the duplication or movement of the first digital image file 3112, a new folder is generated in the second digital image processing apparatus 3702 and the first digital image file 3112 is duplicated or moved to the new folder. As shown in FIG. 5A, if the part indicating the manufacturing company and included in the name of the folder 3110 containing the first digital image file 3112 is included in the name of the folder 3210 of the second digital image processing apparatus 3702 before the duplication or movement of the first digital image file 3112, a model name of a digital image processing apparatus stored in a header of the digital image file 3211, 3212, or 3213 under the folder 3210 of the second digital image processing apparatus 3702 is compared with that of the first digital image file 3112.

If both model names are identical to each other, the first digital image file 3112 is duplicated or moved to the folder 3210 of the second digital image processing apparatus 3702. In this case, the first digital image file 3112 may be renamed to include, for example, a serial number subsequent to a last serial number included therein so that the renamed first digital image file 3112 may be duplicated or moved to the folder 3210 of the second digital image processing apparatus 3702. If a digital image file named "SSL0012.JPG" is contained in the folder 3210 of the second digital image processing apparatus 3702, the first digital image file 3112 of the first digital image processing apparatus 3701 may be renamed to "SSL0013.JPG" and stored or moved to the folder 3210 of the second digital image processing apparatus 3702.

If both model names are not identical to each other, referring to FIG. 5B, a new folder 3220 is generated in the second digital image processing apparatus 3702 and the first digital image file 3112 is duplicated or moved to the new folder 3220. In this case, a name of the folder 3220 generated in the second digital image processing apparatus 3702 may include a part indicating a manufacturing company included in the folder 3110 containing the first digital image file 3112. Also, the name of the folder 3220 generated in the second digital image processing apparatus 3702 may include a serial number greater than a serial number included in the name of the folder 3210 of the second digital image processing apparatus 3702. Now that the "SSCAM" indicates the manufacturing company included in the name of the folder 3110 containing the first digital image file 3112 before duplicated or moved and "100" is the serial number included in the name of the folder 3210 of the second digital image processing apparatus 3702, the name of the folder 3220 generated in the second digital image processing apparatus 3702 may be "101SSCAM" with reference to FIG. 5B. When the first digital image file 3112 is duplicated or moved to the folder 3220 generated in the second digital image processing apparatus 3702, the name of the first digital image file 3112 under the folder 3220 generated in the second digital image processing apparatus 3702 may include an initial serial number. The first digital image file 3112 under the folder 3220 generated in the second digital image processing apparatus 3702 maintains a name format as in the first digital image processing apparatus 3701 before the first digital image file 312 is duplicated or moved but the first digital image file 3112 is renamed "SSL0001.JPG" wherein a serial number is changed to an initial serial number "0001".

The digital image processing apparatuses according to embodiments of the present invention described herein are connected to each other via a cable or wireless communication and duplicate or move digital image files stored in storage media of each digital image processing apparatus, making it possible to systematically arranging and managing digital image files. If digital image processing apparatuses that are connected to each other are manufactured by different manufacturing companies, a new folder is generated and a digital image file is moved or duplicated to the new folder, and if digital image processing apparatuses that are connected to each other are manufactured by the same manufacturing company, model names of digital image processing apparatuses are compared with each other. If digital image processing apparatuses have the same model name, a digital image file is moved or duplicated to a given folder, if digital image processing apparatuses have different model names, a new folder is generated and a digital image file is duplicated or moved, providing a user convenience of management of digital image files.

Figure 6:
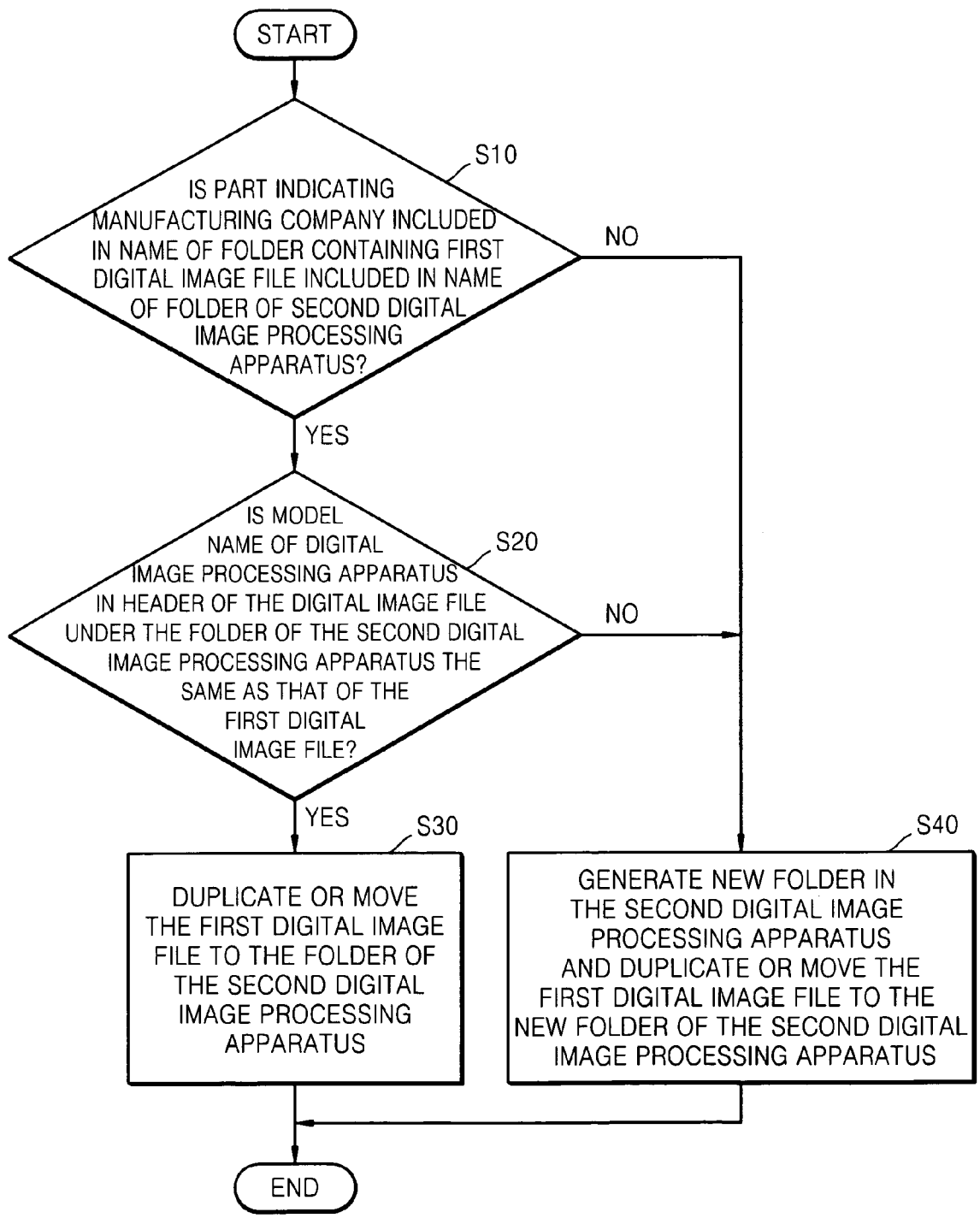
FIG. 6 is a flowchart illustrating an example of a digital image file arranging method used by a digital image processing apparatus, according to another embodiment of the present invention.

FIG. 6 is a flowchart illustrating an example of a digital image file arranging method used by a digital image processing apparatus, according to another embodiment of the present invention. Referring to FIG. 6, when a first digital image file stored in a first digital image processing apparatus is duplicated or moved to a second digital image processing apparatus, a name of a folder containing the first digital image file is compared with a name of a folder of the second digital image processing apparatus, the first digital image file is duplicated or moved to the folder of the second digital image processing apparatus, or a new folder is generated in the second digital image processing apparatus and the first digital image file is duplicated or moved to the new folder of the second digital image processing apparatus.

It is determined whether a part indicating a manufacturing company included in the name of the folder containing the first digital image file is included in the name of the folder of the second digital image processing apparatus in Operation S10. If the part is not included in the name of the folder of the second digital image processing apparatus, a new folder is generated in the second digital image processing apparatus, and the first digital image file is duplicated or moved to the new folder of the second digital image processing apparatus in Operation S40. If the part is included in the name of the folder of the second digital image processing apparatus, it is determined whether a model name of a digital image processing apparatus stored in a header of the digital image file under the folder of the second digital image processing apparatus is compared with that of the first digital image file in Operation S20. If both model names are identical to each other, the first digital image file is duplicated or moved to the folder of the second digital image processing apparatus in Operation S30.

If both model names are not identical to each other, a new folder is generated in the second digital image processing apparatus and the first digital image file is duplicated or moved to the new folder.

Operations of comparing folder names, determining a name of a newly generated folder, and renaming a digital image file of the digital image file arranging method are the same or substantially the same as those described in the digital image processing apparatus. Further, the digital image file arranging method described above is within the scope of the embodiments of the present invention. As described above, a digital image processing apparatus and a file arranging method used by the digital image processing apparatus according to the embodiments of the present invention described herein can effectively manage files during the duplication and movement of a digital image file between digital image processing apparatuses.

While the present invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. A digital image processing apparatus for storing a digital image file with a name including a serial number under a folder with a name including a part indicating a manufacturing company and a serial number, the digital image processing apparatus comprising:
a processor which, when a first digital image file stored in a first digital image processing apparatus is duplicated or moved to a second digital image processing apparatus, compares a name of a folder containing the first digital image file of the first digital image processing apparatus with a name of a folder of the second digital image processing apparatus, duplicates or moves the first digital image file to the folder of the second digital image processing apparatus, or generates a new folder in the second digital image processing apparatus and duplicates or moves the first digital image file to the new folder of the second digital image processing apparatus;
wherein
if the part indicating the manufacturing company included in the name of the folder containing the first digital image file is included in the name of the folder of the second digital image processing apparatus before the duplication or movement of the first digital image file, the processor compares a model name of a digital image processing apparatus stored in a header of the digital image file under the folder of the second digital image processing apparatus with that of the first digital image, if both model names are identical to each other, duplicates or moves the first digital image file to the folder of the second digital image processing apparatus, and if both model names are not identical to each other, generates a new folder in the second digital image processing apparatus and duplicates or moves the first digital image file to the new folder.

2. The digital image processing apparatus of claim 1, wherein, if the part indicating the manufacturing company included in the name of the folder containing the first digital image file is not included in the name of the folder of the second digital image processing apparatus before the duplication or movement of the first digital image file, the processor generates the new folder in the second digital image processing apparatus and duplicates or moves the first digital image file to the new folder.

3. The digital image processing apparatus of claim 2, wherein a name of the new folder generated in the second digital image processing apparatus includes the part indicating the manufacturing company included in the folder containing the first digital image file.

4. The digital image processing apparatus of claim 2, wherein the name of the new folder generated in the second digital image processing apparatus includes a serial number greater than a serial number included in the name of the folder of the second digital image processing apparatus.

5. The digital image processing apparatus of claim 2, wherein, when the digital image processing apparatus duplicates or moves the first digital image file to the new folder generated in the second digital image processing apparatus, the name of the first digital image file under a new folder generated in the second digital image processing apparatus includes an initial serial number.

6. The digital image processing apparatus of claim 1, wherein, if the part indicating the manufacturing company included in the name of the folder containing the first digital image file is included in the name of the folder of the second digital image processing apparatus before the duplication or movement of the first digital image file, the processor duplicates or moves the first digital image file to the folder of the second digital image processing apparatus.

7. The digital image processing apparatus of claim 6, wherein, when the digital image processing apparatus duplicates or moves the first digital image file to the folder of the second digital image processing apparatus, the name of the first digital image file under the folder of the second digital image processing apparatus includes a serial number subsequent to a last serial number included in a digital image file contained in the folder of the second digital image processing apparatus.

8. A digital image processing apparatus for storing a digital image file with a name including a serial number under a folder with a name including a part indicating a manufacturing company and a serial number, the digital image processing apparatus comprising:
a processor which, when a first digital image file stored in a first digital image processing apparatus is duplicated or moved to a second digital image processing apparatus, compares a name of a folder containing the first digital image file of the first digital image processing apparatus with a name of a folder of the second digital image processing apparatus, duplicates or moves the first digital image file to the folder of the second digital image processing apparatus, or generates a new folder in the second digital image processing apparatus and duplicates or moves the first digital image file to the new folder of the second digital image processing apparatus;
wherein:
if the part indicating the manufacturing company included in the name of the folder containing the first digital image file is included in the name of the folder of the second digital image processing apparatus before the duplication or movement of the first digital image file, the processor compares a model name of a digital image processing apparatus stored in a header of the digital image file under the folder of the second digital image processing apparatus with that of the first digital image, if both model names are identical to each other, duplicates or moves the first digital image file to the folder of the second digital image processing apparatus, and if both model names are not identical to each other, generates a new folder in the second digital image processing apparatus and duplicates or moves the first digital image file to the new folder; and a name of the folder generated in the second digital image processing apparatus includes the part indicating the manufacturing company included in the folder containing the first digital image file, and a serial number greater than a serial number included in the name of the folder of the second digital image processing apparatus before the duplication or movement of the first digital image file.

9. The digital image processing apparatus of claim 8, wherein, if the part indicating the manufacturing company included in the name of the folder containing the first digital image file is not included in the name of the folder of the second digital image processing apparatus before the duplication or movement of the first digital image file, the processor generates the new folder in the second digital image processing apparatus and duplicates or moves the first digital image file to the new folder.

10. The digital image processing apparatus of claim 8, wherein, if the part indicating the manufacturing company included in the name of the folder containing the first digital image file is included in the name of the folder of the second digital image processing apparatus before the duplication or movement of the first digital image file, the processor duplicates or moves the first digital image file to the folder of the second digital image processing apparatus.

11. A digital image processing apparatus for storing a digital image file with a name including a serial number under a folder with a name including a part indicating a manufacturing company and a serial number, the digital image processing apparatus comprising:

a processor which, when a first digital image file stored in a first digital image processing apparatus is duplicated or moved to a second digital image processing apparatus, compares a name of a folder containing the first digital image file of the first digital image processing apparatus with a name of a folder of the second digital image processing apparatus, duplicates or moves the first digital image file to the folder of the second digital image processing apparatus, or generates a new folder in the second digital image processing apparatus and duplicates or moves the first digital image file to the new folder of the second digital image processing apparatus;

wherein:

if the part indicating the manufacturing company included in the name of the folder containing the first digital image file is included in the name of the folder of the second digital image processing apparatus before the duplication or movement of the first digital image file, the processor compares a model name of a digital image processing apparatus stored in a header of the digital image file under the folder of the second digital image processing apparatus with that of the first digital image, if both model names are identical to each other, duplicates or moves the first digital image file to the folder of the second digital image processing apparatus, and if both model names are not identical to each other, generates a new folder in the second digital image processing apparatus and duplicates or moves the first digital image file to the new folder; and when the digital image processing apparatus duplicates or moves the first digital image file to the new folder generated in the second digital image processing apparatus, the name of the first digital image file under a new folder generated in the second digital image processing apparatus includes an initial serial number.

12. The digital image processing apparatus of claim 11, wherein, if the part indicating the manufacturing company included in the name of the folder containing the first digital image file is not included in the name of the folder of the second digital image processing apparatus before the duplication or movement of the first digital image file, the processor generates the new folder in the second digital image processing apparatus and duplicates or moves the first digital image file to the new folder.

13. The digital image processing apparatus of claim 11, wherein, if the part indicating the manufacturing company included in the name of the folder containing the first digital image file is included in the name of the folder of the second digital image processing apparatus before the duplication or movement of the first digital image file, the processor duplicates or moves the first digital image file to the folder of the second digital image processing apparatus.

14. A digital image processing apparatus for storing a digital image file with a name including a serial number under a folder with a name including a part indicating a manufacturing company and a serial number, the digital image processing apparatus comprising:

a processor which, when a first digital image file stored in a first digital image processing apparatus is duplicated or moved to a second digital image processing apparatus, compares a name of a folder containing the first digital image file of the first digital image processing apparatus with a name of a folder of the second digital image processing apparatus, duplicates or moves the first digital image file to the folder of the second digital image processing apparatus, or generates a new folder in the second digital image processing apparatus and duplicates or moves the first digital image file to the new folder of the second digital image processing apparatus;

wherein:

if the part indicating the manufacturing company included in the name of the folder containing the first digital image file is included in the name of the folder of the second digital image processing apparatus before the duplication or movement of the first digital image file, the processor compares a model name of a digital image processing apparatus stored in a header of the digital image file under the folder of the second digital image processing apparatus with that of the first digital image, if both model names are identical to each other, duplicates or moves the first digital image file to the folder of the second digital image processing apparatus, and if both model names are not identical to each other, generates a new folder in the second digital image processing apparatus and duplicates or moves the first digital image file to the new folder; and when the digital image processing apparatus duplicates or moves the first digital image file to the folder of the second digital image processing apparatus, the name of the first digital image file under the folder of the second digital image processing apparatus includes a serial number subsequent to a last serial number included in a digital image file contained in the folder of the second digital image processing apparatus.

15. The digital image processing apparatus of claim 14, wherein, if the part indicating the manufacturing company included in the name of the folder containing the first digital image file is not included in the name of the folder of the second digital image processing apparatus before the duplication or movement of the first digital image file, the processor generates the new folder in the second digital image processing apparatus and duplicates or moves the first digital image file to the new folder.

16. The digital image processing apparatus of claim 14, wherein, if the part indicating the manufacturing company included in the name of the folder containing the first digital image file is included in the name of the folder of the second digital image processing apparatus before the duplication or movement of the first digital image file, the processor duplicates or moves the first digital image file to the folder of the second digital image processing apparatus.

17. A digital image file arranging method used by a digital image processing apparatus for storing a digital image file with a name including a serial number under a folder with a name including a part indicating a manufacturing company and a serial number, the method comprising:

when a first digital image file stored in a first digital image processing apparatus is duplicated or moved to a second digital image processing apparatus, comparing a name of a folder containing the first digital image file of the first digital image processing apparatus with a name of a folder of the second digital image processing apparatus, duplicating or moving the first digital image file to the folder of the second digital image processing apparatus, or generating a new folder in the second digital image processing apparatus, and duplicating or moving the first digital image file to the new folder of the second digital image processing apparatus;

wherein, if the part indicating the manufacturing company included in the name of the folder containing the first digital image file is included in the name of the folder of the second digital image processing apparatus before the duplication or movement of the first digital image file, a model name of a digital image processing apparatus stored in a header of the digital image file under the folder of the second digital image processing apparatus is compared with that of the first digital image, if both model names are identical to each other, the first digital image file is duplicated or moved to the folder of the second digital image processing apparatus, and if both model names are not identical to each other, a new folder is generated in the second digital image processing apparatus, and the first digital image file is duplicated or moved to the new folder.

18. The method of claim 17, wherein, if the part indicating the manufacturing company included in the name of the folder containing the first digital image file is not included in the name of the folder of the second digital image processing apparatus before the duplication or movement of the first digital image file, the new folder is generated in the second digital image processing apparatus and the first digital image file is duplicated or moved to the new folder.

19. The method of claim 18, wherein a name of the new folder generated in the second digital image processing apparatus includes the part indicating the manufacturing company included in the folder containing the first digital image file.

20. The method of claim 18, wherein the name of the new folder generated in the second digital image processing apparatus includes a serial number greater than a serial number included in the name of the folder of the second digital image processing apparatus.

21. The method of claim 18, wherein, when the first digital image file is duplicated or moved to the new folder generated in the second digital image processing apparatus, the name of the first digital image file under the new folder generated in the second digital image processing apparatus includes an initial serial number.

22. The method of claim 17, wherein, if the part indicating the manufacturing company included in the name of the folder containing the first digital image file is included in the name of the folder of the second digital image processing apparatus before the duplication or movement of the first digital image file, the first digital image file is duplicated or moved to the folder of the second digital image processing apparatus.

23. The method of claim 22, wherein, when the first digital image file is duplicated or moved to the folder of the second digital image processing apparatus, the name of the first digital image file under the folder of the second digital image processing apparatus includes a serial number subsequent to a last serial number included in a digital image file contained in the folder of the second digital image processing apparatus.

24. The method of claim 17, wherein a name of the folder generated in the second digital image processing apparatus includes the part indicating the manufacturing company included in the folder containing the first digital image file, and a serial number greater than a serial number included in the name of the folder of the second digital image processing apparatus before the duplication or movement of the first digital image file.

25. The method of claim 17, wherein, when the first digital image file is duplicated or moved to the new folder generated in the second digital image processing apparatus, the name of the first digital image file under the new folder generated in the second digital image processing apparatus includes an initial serial number.

26. The method of claim 17, wherein, when the first digital image file is duplicated or moved to the folder of the second digital image processing apparatus, the name of the first digital image file under the folder of the second digital image processing apparatus includes a serial number subsequent to a last serial number included in a digital image file contained in the folder of the second digital image processing apparatus.

* * * * *